United States Patent
Han et al.

(10) Patent No.: US 7,268,975 B2
(45) Date of Patent: Sep. 11, 2007

(54) HIGH DATA RATE WRITER WITH LOW RESISTANCE COIL AND SHORT YOKE

(75) Inventors: Cherng Chyi Han, San Jose, CA (US); Mao-Min Chen, San Jose, CA (US); Pokang Wang, San Jose, CA (US); Yimin Guo, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 253 days.

(21) Appl. No.: 11/042,487

(22) Filed: Jan. 25, 2005

(65) Prior Publication Data

US 2005/0122621 A1 Jun. 9, 2005

Related U.S. Application Data

(62) Division of application No. 10/279,265, filed on Oct. 24, 2002, now Pat. No. 6,851,178.

(51) Int. Cl.
*G11B 5/31* (2006.01)
*G11B 5/17* (2006.01)
*G11B 5/127* (2006.01)
*G11B 5/23* (2006.01)

(52) U.S. Cl. ...................... 360/126; 360/120
(58) Field of Classification Search ................ 360/125, 360/126, 120
See application file for complete search history.

(56) References Cited

U.S. PATENT DOCUMENTS

| | | | | |
|---|---|---|---|---|
| 4,872,079 A | * | 10/1989 | Roberts ...................... 360/126 |
| 5,155,646 A | * | 10/1992 | Fujisawa et al. ............ 360/126 |
| 5,812,350 A | * | 9/1998 | Chen et al. .................. 360/126 |
| 6,118,629 A | * | 9/2000 | Huai et al. ................... 360/126 |
| 6,130,809 A | * | 10/2000 | Santini ........................ 360/317 |
| 6,154,346 A | * | 11/2000 | Sasaki ......................... 360/317 |
| 6,259,585 B1 | * | 7/2001 | Sasaki et al. ............... 360/317 |
| 6,296,776 B1 | * | 10/2001 | Sasaki .......................... 216/22 |
| 6,304,414 B1 | | 10/2001 | Crue, Jr. et al. ............ 360/126 |
| 6,317,280 B1 | | 11/2001 | Nakajima et al. ............. 360/59 |
| 6,325,947 B1 | | 12/2001 | Garfunkel et al. ............ 216/22 |
| 6,333,830 B2 | | 12/2001 | Rose et al. .................. 360/123 |
| 6,339,523 B1 | | 1/2002 | Santini ........................ 360/317 |
| 6,407,885 B1 | * | 6/2002 | Ahagon et al. ............. 360/126 |
| 6,452,756 B1 | * | 9/2002 | Sasaki ......................... 360/317 |
| 6,775,902 B1 | * | 8/2004 | Huai et al. ................ 29/603.14 |
| 2002/0067570 A1 | * | 6/2002 | Sasaki et al. ............... 360/126 |
| 2003/0030940 A1 | * | 2/2003 | Matono ....................... 360/126 |
| 2004/0004056 A1 | * | 1/2004 | Sasaki et al. .................. 216/22 |

FOREIGN PATENT DOCUMENTS

JP 11213332 A * 8/1999

* cited by examiner

*Primary Examiner*—William J Klimowicz
(74) *Attorney, Agent, or Firm*—Saile Ackerman LLC; Stephen B. Ackerman

(57) ABSTRACT

One of the major requirements for higher frequency extendability is to reduce yoke length and inductance in order to have fast saturation. This has been accomplished by using a design that provides a cavity in the lower pole piece inside which is located at least two coils, one on top of the other. A process for manufacturing the device is also described.

12 Claims, 6 Drawing Sheets

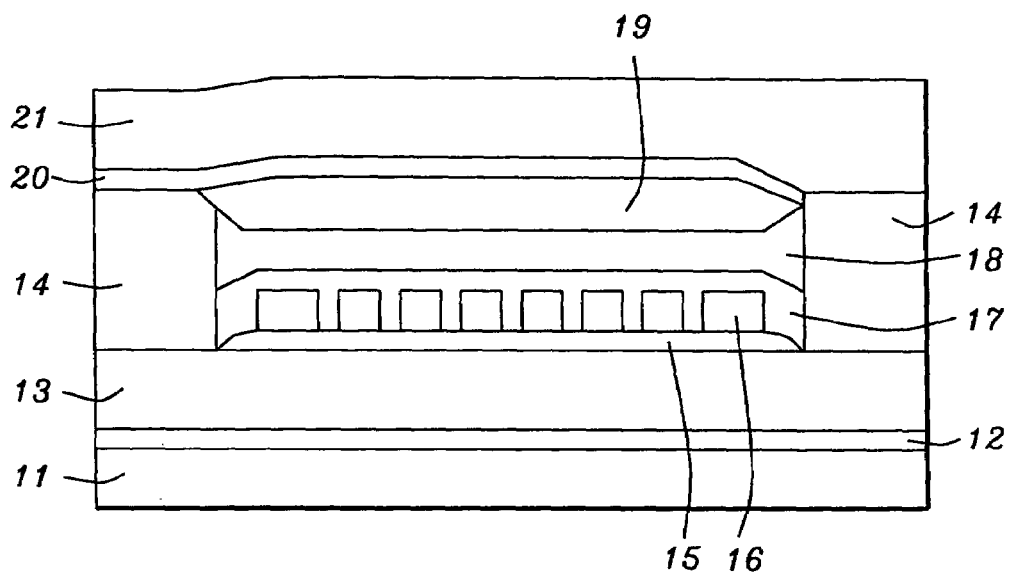
FIG. 1 – Prior Art
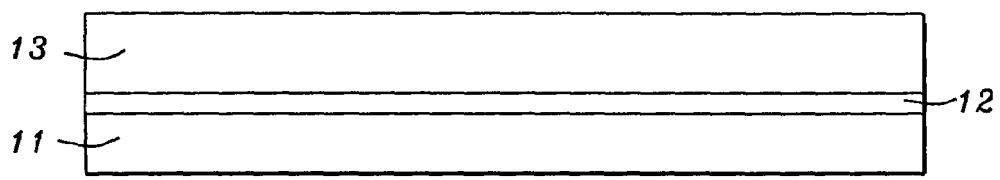
FIG. 2
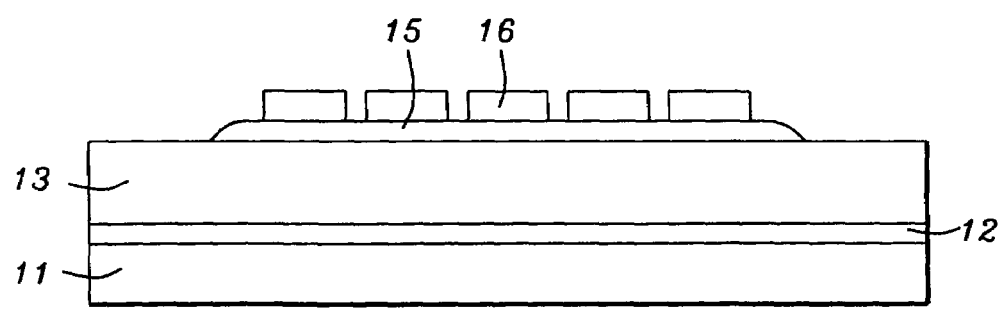
FIG. 3

HIGH DATA RATE WRITER WITH LOW RESISTANCE COIL AND SHORT YOKE

This is a division of Patent Application Ser. No. 10/279,265, filing date Oct. 24, 2002 now U.S. Pat. No. 6,851,178, "High data rate writer with low resistance coil short yoke" assigned to the same assignee as the present invention, which is herein incorporated by reference in its entirety.

FIELD OF THE INVENTION

The invention relates to the general field of magnetic write heads for data storage systems with particular reference to increasing the writing speed.

BACKGROUND OF THE INVENTION

There are several design options available to make high data rate writers. One of the major requirements for higher frequency extendability is to reduce yoke length and inductance in order to have fast saturation. Given fast saturation during the writing process, one can have better overwrite and cold overwrite performance at higher frequency. Some designs for faster write heads have the planar writer with a short yoke length. However, one of the drawbacks of this design is the coil real estate utilization which creates either high DC coil resistance or requires a small number of coil turns.

In FIG. 1 we show a typical write head of the prior art. Seen there is magnetic shield 11 which is separated from the lower magnetic pole by insulating layer 12. The lower pole is made up of two parts—base 13 and upper portion 14 which is open so that it forms a cavity. In this cavity is housed magnetic coil 16 which is seated on shallow pedestal 15. Insulating layers 17 and 18 cover the coil while insulating layer 19 serves to control throat height (see later). Non-magnetic gap layer 20 separates the lower coil structure from upper pole 21.

A routine search of the prior art was performed with the following references of interest being found:

In U.S. Pat. No. 6,325,947 B1, Garfunkel et al. show a process for a head with a short yoke while Nakajima et al. show a process for a head in U.S. Pat. No. 6,317,280 B1. Santini shows a process for a head in U.S. Pat. No. 6,339,523 B1 and related patents are U.S. Pat. No. 6,333,830 B2 (Rose et al.) and U.S. Pat. No. 6,304,414 B1 (Crue, Jr. et al.).

SUMMARY OF THE INVENTION

It has been an object of at least one embodiment of the present invention to provide a magnetic write head having fast saturation.

Another object of at least one embodiment of the present invention has been that said write head occupy minimum real estate and have minimum electrical resistance.

Still another object of at least one embodiment of the present invention has been to provide a process for manufacturing said write head.

These objects have been achieved by forming a cavity in the lower pole piece and locating therein at least two coils, one on top of the other. A process for manufacturing the device is also described.

BRIEF DESCRIPTION OF THE DRAWINGS

FIG. 1 shows a typical write head of the prior art.

FIG. 2 shows the starting point for the process of the present invention.

FIGS. 3-5 show steps leading to the formation of the lower coil and the cavity in which it is housed.

DESCRIPTION OF THE PREFERRED EMBODIMENTS

Figure 4:
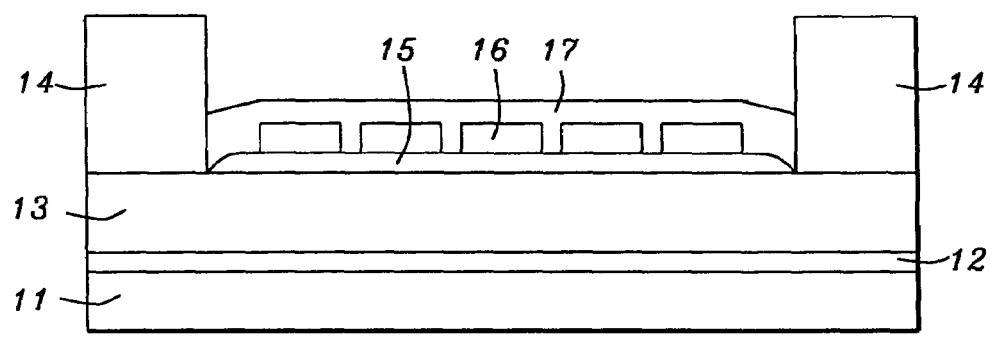

The present invention is based on a two layer coil structure for a planar writer. This two layer structure design leads to low DC coil resistance relative to similar designs having a short yoke.

A key feature is breaking the lower pole into two separate layers which allows the achievement of an optimized coil space for each coil. This two layer coil structure enables one to maintain the same planar writer structure but with better performance on fast saturation and lower DC coil resistance or better thermal pole tip protrusion.

The process of the present invention begins, as shown in FIG. 2, with the deposition of layer 11 which will serve as the lower magnetic shield. It is between about 1 and 2 microns thick and is of a metal such as NiFe or CoNiFe. This is followed by layer 12, between about 1,000 and 5,000 Angstroms thick, made of alumina, whose purpose is to separate the reader shield and the writer's bottom pole. Then, layer 13 (of the writer's bottom pole) is deposited onto layer 12 to a thickness between about 1 and 2 microns. It will serve as the lower magnetic pole of the writer.

Referring now to FIG. 3, insulating layer 15 (of alumina or silica), between about 1,000 and 3,000 Angstroms thick, is deposited onto layer 13 and patterned to form a low pedestal. This is followed by the deposition of a seed layer, typically of copper, (not shown) which, after protection of the appropriate areas by photoresist (also not shown), is used as a base onto which to electrodeposit lower coil 16. After removal of both the photoresist and the seed layer, the structure is as seen in FIG. 3.

Next, as shown in FIG. 4, the upper section 14 of the lower pole is formed by electroplating. Insulating layer 17 is then formed of photoresist to a thickness that is between about 1 and 1.5 microns, and then selectively removed from above 14, giving the structure the appearance seen in FIG. 4. Layer 17 is then hard baked to become a permanent insulating layer.

Figure 5:
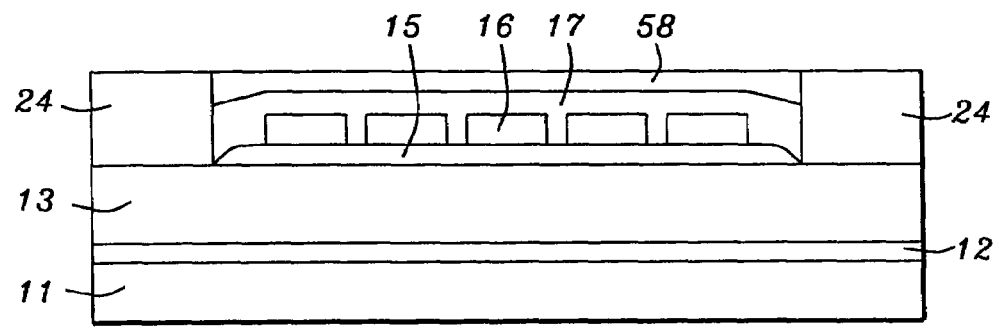

The next step is the overfilling of the space above layer 17 with insulating layer 58 following which the structure is planarized (typically using CMP) so that the thickness of the upper portion of the lower pole (now shown as layer 24) is reduced, as can be seen in FIG. 5. The deposition is performed in two separate layers is to avoid void formation in layer 58.

Figure 6:
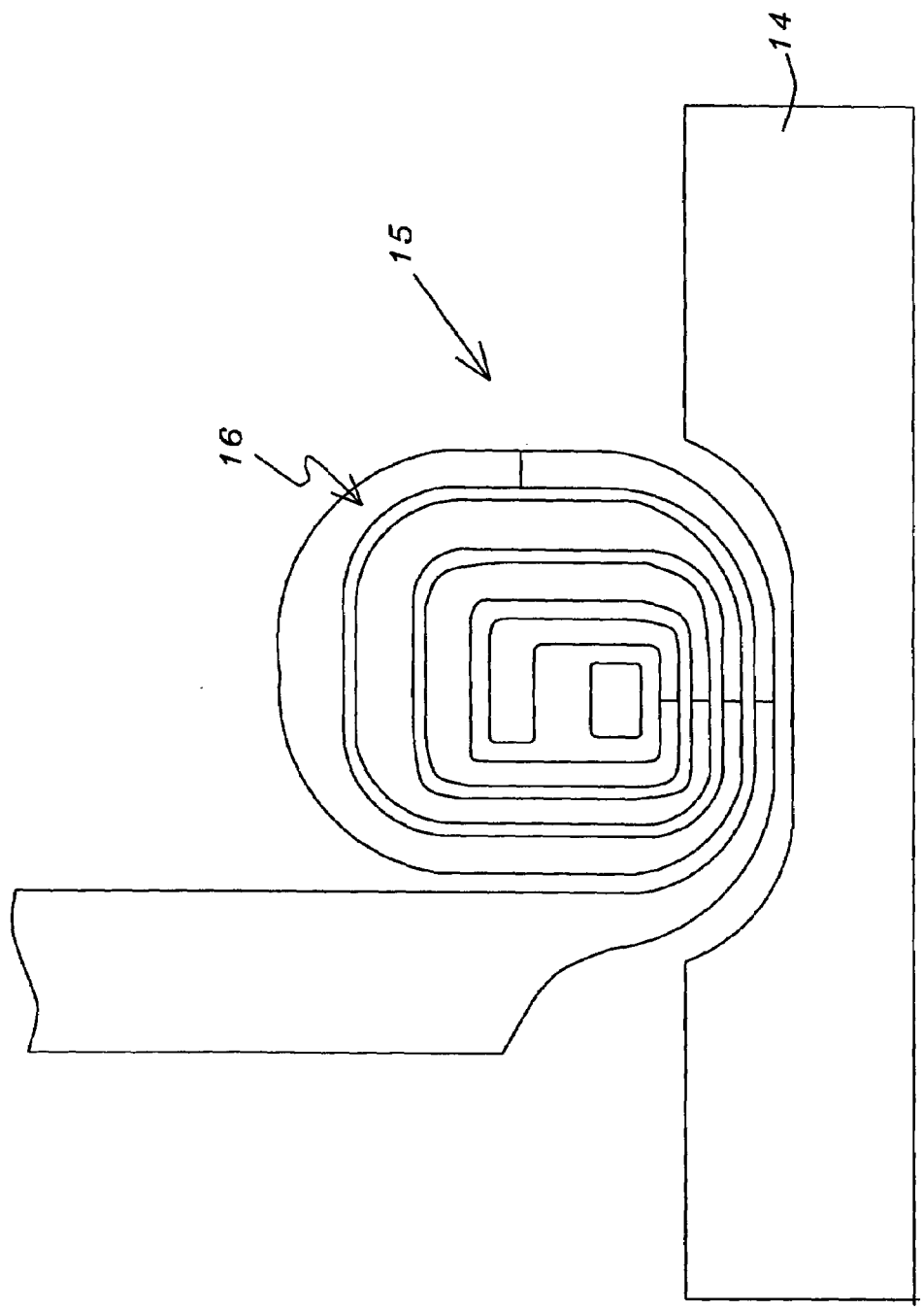
FIG. 6 is a plan view of the cross-sectional view seen in FIG. 5.

FIG. 6 is a plan view of the structure whose cross-section we saw in FIG. 5.

Figure 7:
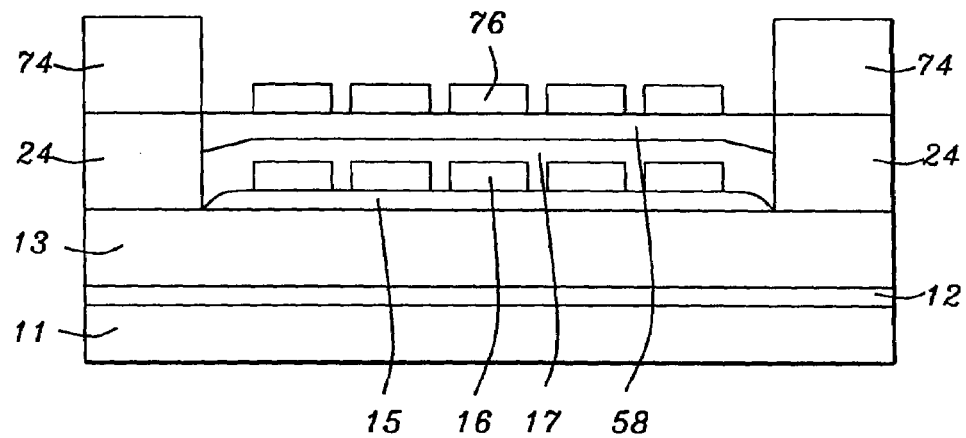
FIGS. 7-8 show steps leading to the formation of the upper coil and the cavity in which it is housed.
Figure 8:
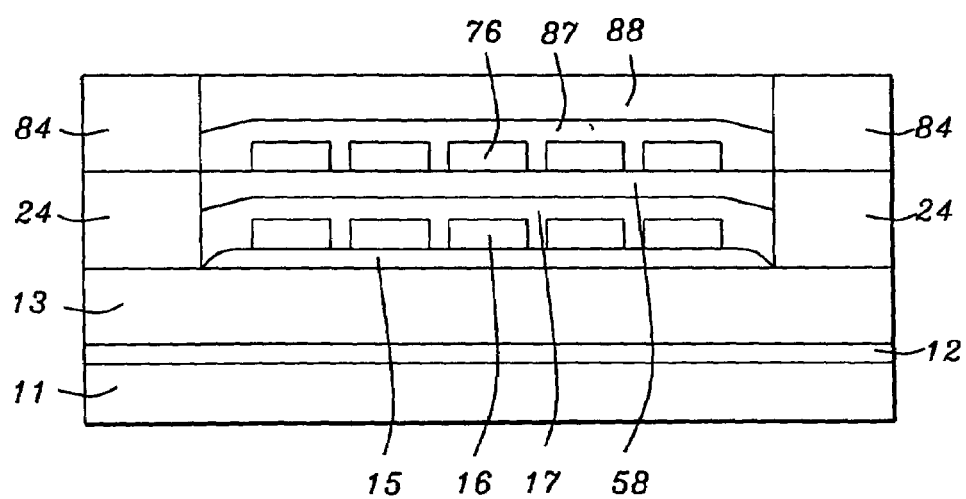

The process continues with the formation of upper coil 76 which is formed on the surface of layer 58 in a similar manner to that described above for lower coil 16. Layers 76, 87 and 88 are formed using similar materials and thicknesses to layers 16, 17 and 58 respectively as shown in FIG. 7. This is followed, as before, by a planarization step whereby layer 74 is reduced in thickness, being now designated as 84 in FIG. 8.

Figure 9:
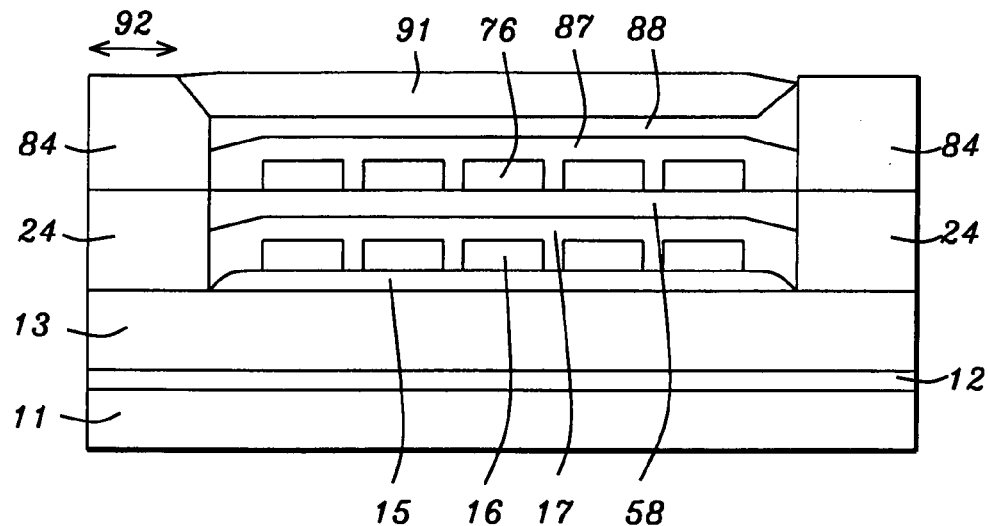
FIG. 9 shows the step for controlling the throat height of the device.

Referring next to FIG. 9, a shallow trench, between about 2,000 and 4,000 Angstroms deep, is etched into layer 88 as well as a small portion of the lower pole on one side of the structure only. This cavity is then overfilled with material 91 (such as alumina or silica) and the structure is then planarized, as shown in FIG. 9 until some of layer 84 begins to be removed. As a result, width 92 of the lower pole, on one side, is gradually decreased so that the throat height of the finished structure can be controlled.

Figure 10:
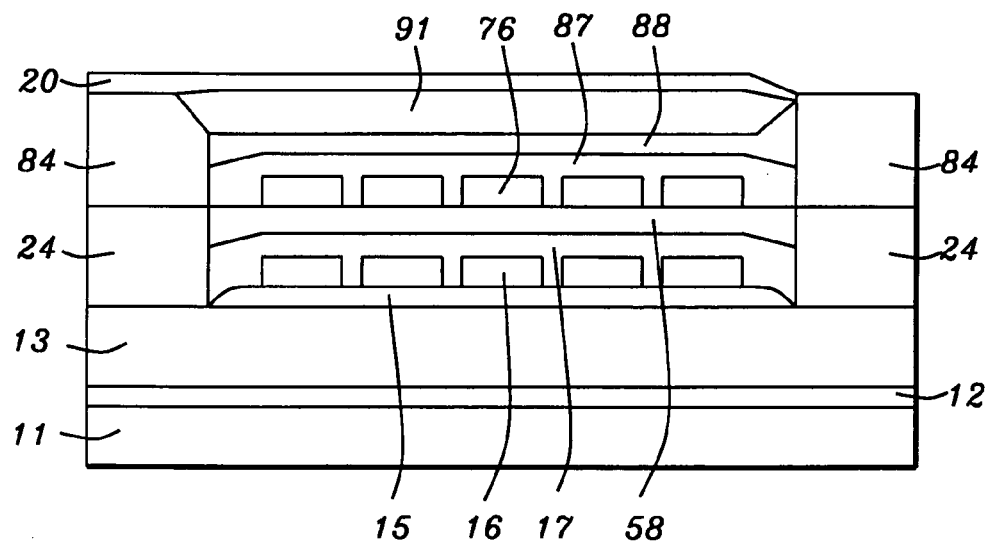
FIG. 10 shows the addition of the non-magnetic gap layer.

FIG. 10 shows the structure after the deposition of write gap layer 20. In principle this could be any non-magnetic material but our preferred material for layer 20 has been ruthenium, deposited to a thickness between about 700 and 1,200 Angstroms. Note that layer 20 has been selectively removed from the one side of lower pole 84 to form a flux transmission area that will allows unimpeded passage of magnetic flux between the upper and lower magnetic poles.

Figure 11:
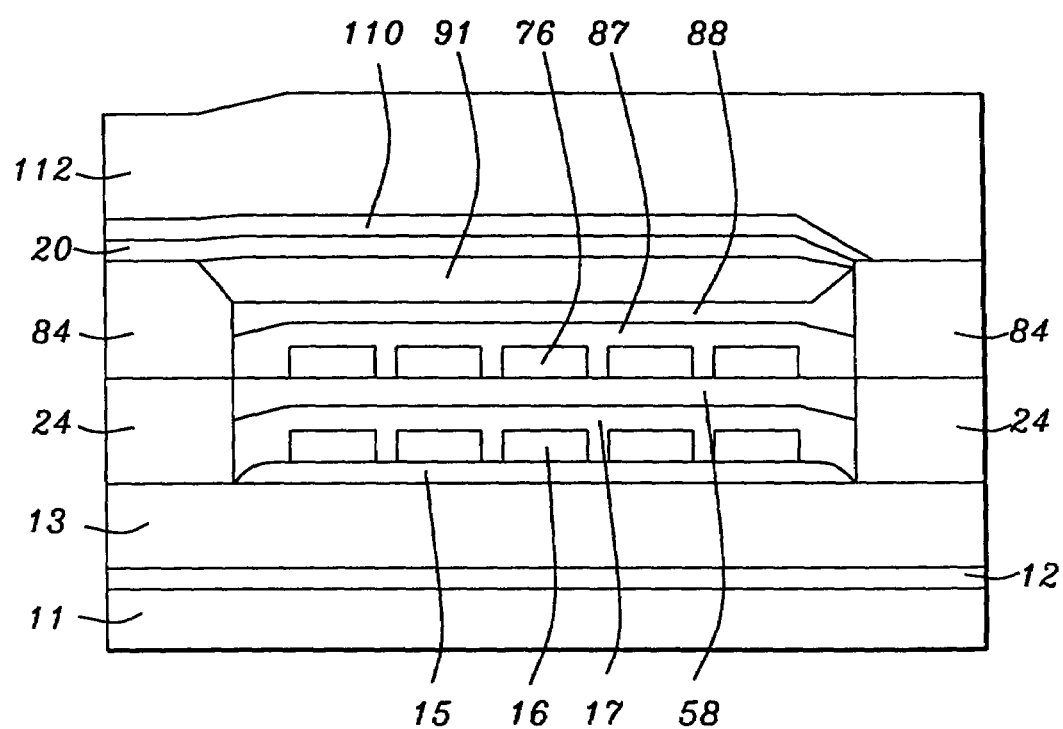
FIG. 11 shows the completed device.

The process of the present invention concludes with the successive depositions of layers 110 and 112, as illustrated in FIG. 11. Layer 110 is between about 1,000 and 3,000 Angstroms thick and is made of a material capable of sustaining a very high magnetic moment. Examples are CoFeN and CoFe, with CoFeN being preferred. The magnetic permeability of layer 110 was generally between about 700 and 1,000. The presence of layer 110 right above write gap 20 ensures a concentration of magnetic flux in the immediate vicinity of the latter. Layer 112 is of the same material as layers 13, 24, and 84 and serves as the upper magnetic pole. It is between about 1 and 1.5 microns thick.

What is claimed is:

1. A magnetic write head, comprising:
   a first insulating layer on a shield layer
   a lower magnetic pole on said first insulating layer;
   centrally disposed within said lower magnetic pole, a cavity having first sidewalls and a floor;
   in said cavity:
      a second insulating layer in the form of a low pedestal on said floor;
      on said pedestal a lower coil of conductive material;
      a third insulating layer that covers said pedestal and lower coil;
      a fourth insulating layer on said third insulating layer;
      on said fourth insulator, an upper coil of conductive material that is connected to said lower coil by a conductive via;
      a fifth insulating layer on said upper coil and said fourth insulating layer;
      a sixth insulating layer on said fifth insulating layer;
      in said sixth insulating layer, a shallow trench, filled with a seventh insulating layer, having sloping second sidewalls, said second sidewalls overlapping said first sidewalls in one area;
   over said cavity:
      a non-magnetic gap layer on said seventh insulating layer and on all of said lower magnetic pole except for a flux transmission area located on said lower pole away from said sidewall overlapping area;
      a layer of a high magnetic moment material on said gap layer and on said flux transmission area; and
      on said high magnetic moment layer, an upper magnetic pole.

2. The write head described in claim 1 wherein said first insulating layer is alumina and has a thickness between about 1,000 and 3,000 Angstroms.

3. The write head described in claim 1 wherein said second insulating layer is alumina and has a thickness between about 1,000 and 3,000 Angstroms.

4. The write head described in claim 1 wherein said third insulating layer is baked photoresist and has a thickness between about 6,000 and 10,000 Angstroms.

5. The write head described in claim 1 wherein said fourth insulating layer is alumina and has a thickness between about 1,000 and 5,000 Angstroms.

6. The write head described in claim 1 wherein said fifth insulating layer is baked photoresist and has a thickness between about 6,000 and 10,000 Angstroms.

7. The write head described in claim 1 wherein said sixth insulating layer is alumina and has a thickness between about 1,000 and 5,000 Angstroms.

8. The write head described in claim 1 wherein said seventh insulating layer is alumina and has a thickness between about 4,000 and 5,000 Angstroms.

9. The write head described in claim 1 wherein said non-magnetic gap layer is ruthenium or rhodium and has a thickness between about 700 and 1,000 Angstroms.

10. The write head described in claim 1 wherein said high magnetic moment material is CoFeN and has a thickness between about 1,000 and 6,000 Angstroms.

11. The write head described in claim 1 wherein said write head has a throat height that is between about 0.6 and 1.2 microns.

12. The write head described in claim 1 wherein each coil has at least 4 turns.

* * * * *